Jan. 3, 1961 D. MARTIN 2,966,753

COMBINED DESK PADS AND TELEPHONE INDEXES

Filed April 1, 1959

INVENTOR.
David Martin
BY
Franklin W. Durgin
AGENT.

United States Patent Office 2,966,753

Patented Jan. 3, 1961

2,966,753

COMBINED DESK PADS AND TELEPHONE INDEXES

David Martin, Silver Mine Ave., Norwalk, Conn.

Filed Apr. 1, 1959, Ser. No. 803,517

2 Claims. (Cl. 40—64)

The present invention relates to improvements in stationery and more particularly to combined desk pads and indexes for telephone subscribers' numbers or the like.

An important object of the invention is to provide a desk pad with a telephone index along one side margin thereof, which serves as a finish element complemental to a conventional side pocket or to the usual corner pockets of a desk pad.

Another object of the invention is the provision of a desk pad with an elongated telephone index device having end portions adapted for removable disposition in adjacent corner pockets of the desk pad.

A further object of the invention is to provide an improved index for telephone numbers which is so constructed as to facilitate maintenance of the telephone subscribers' names in alphabetical order.

A still further object is the provision of an improved index for telephone subscribers' numbers so constructed as to facilitate the insertion of new numbers and the removal of numbers which have fallen into disuse.

Other objects and advantages of the invention will become apparent during the course of the following detailed description taken in connection with the accompanying drawing forming part of this specification and in which drawing, Fig. 1 is a top plan view of a preferred form of combined desk pad and telephone index.

Figure 1:
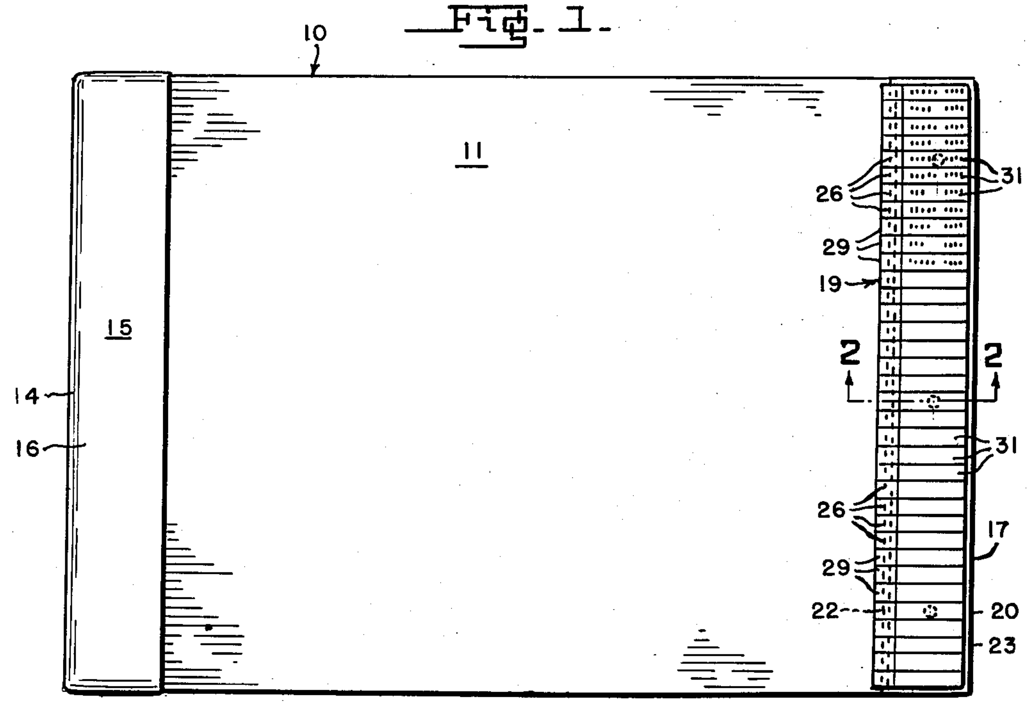

In the drawing which for the purpose of illustration shows preferred and modified forms of the invention and wherein similar reference numerals designate the corresponding parts throughout the views, the numeral 10 generally designates a desk pad having a rectangular main body portion 11 which may be formed of any suitable sheet material such as linoleum or fiber board secured to a felt base 12 as by a layer of adhesive 13. The left side 14 of the desk pad 10 is provided with a conventional side pocket 15 which may be formed of some suitable ornamental material such as leather and which extends along the entire left side margin 16 of the desk pad 10.

Figures 2, 3, 4:
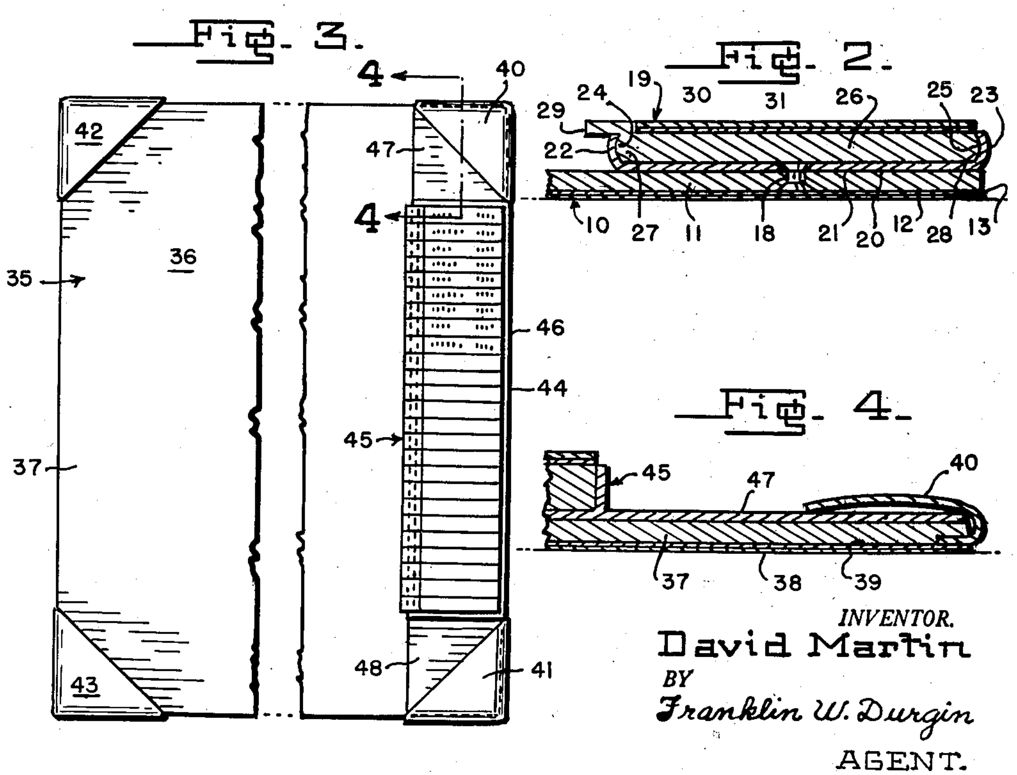
Fig. 2 is a fragmentary vertical sectional view of the combined desk pad and telephone index taken substantially along the line 2—2 of Fig. 1.
Fig. 3 is a fragmentary top plan view of a modified form of combined desk pad and telephone index.
Fig. 4 is a fragmentary vertical sectional view of the combined desk pad and telephone index shown in Fig. 3 and taken substantially along the line 4—4 thereof.

Extending along the right side margin 17 of the desk pad 10 and affixed thereto as by rivets such as shown at 18 in Fig. 2 is an elongated telephone index device 19 complementary to the previously described ornamental side pocket 15. This telephone index device 19 comprises an elongated channel member 20 having a central web portion 21 serving as a base and a pair of resilient flange portions 22, 23 extending from opposite sides of the base 21 and disposed in normally upturned spaced parallel relation. The channel member 20 may be formed of resilient sheet steel and the flange portions 22, 23 are curved in the direction of their widths to define longitudinally concave confronting surfaces 24, 25.

Removably disposed transversely in the elongated channel member 20 is a plurality of oblong plates 26 having convexly rounded end portions 27, 28, the curvature being in the direction of the thickness of the plates. Each of these plates 26 is provided at its normally left end portion 27 with a ledge 29 overhanging the left flange portion 22 of the channel member 20. Secured to the top surfaces of the oblong plates 26 as by adhesive 30 are rectangular indicia-displaying slips 31 of paper or other suitable material. The indicia such as names and numbers of a selected group of telephone subscribers may be typed in a continuous operation on a self-adhesive roll (not shown) of initially-connected labels which are subsequently separated as by cutting or tearing and then individually affixed to the plates 26. The oblong plates 26 are of a length between their rounded end portions 27, 28 such that they require a slight downward pressure in order to snap them into the channel member 20 between the resilient curved side flanges 22, 23 thereof whereby the oblong plates 26 are held against unintentional or casual removal from the channel member 20 by the spring tension exerted on the plate ends 27, 28 by the channel side flanges 22, 23 and more especially by virtue of the gripping engagement of the convex ends 27, 28 with the concave surfaces 24, 25 of the plates 26 and side flanges 22, 23. However, a slight upward pressure on the overhanging ledge portion 29 of any one of the oblong plates 26 will extract that plate from the channel member 20 by lever action of the plate pivoting on the right side flange 22 of the channel member 20 which serves as a fulcrum. By removing one or more of the oblong plates 26, the other plates remaining in the channel member 20 may be slid longitudinally upwardly or downwardly upon overcoming the frictional resistance existing between the ends 27, 28 of the oblong plates 26 and the spring flanges 22, 23.

Referring now to the modified form of combined desk pad and telephone index device 35 shown in Figs. 3 and 4, the desk pad 36 comprises a rectangular main body portion 37 mounted on a felt base 38 as by a layer of adhesive 39 and provided with four corner pockets 40—43 of the usual triangular shape, the two right pockets 40, 41 opening toward the right side margin 44 of the desk pad 36. Extending along the right side margin 44 between the right corner pockets 40, 41 is an elongated telephone index device 45 like the previously described telephone index device 19 shown in Figs. 1 and 2 but somewhat shorter and provided with an elongate channel member 46 having flat integral lugs 47, 48 extending from opposite ends thereof and projecting into the right corner pockets 40, 41. The operation and the utility of this telephone index device 45 are like those of the previously described telephone index device 19 but additionally it may be readily removed from its associated desk pad 36 by sliding the end lugs 47, 48 laterally from the corner pockets 40, 41 as for instance in case it is desired to take the index device 45 itself to a different office or location.

Various changes may be made in the forms of invention herein shown and described without departing from the spirit of the invention or the scope of the following claims.

I claim:

1. A changeable indicia displaying device comprising an elongated channel member having a central web portion serving as a base and a pair of resilient flange portions extending from opposite sides of the base and disposed in normally upturned spaced parallel relation, said flange portions being curved in the direction of their widths to define longitudinally concave confronting surfaces, a plurality of oblong plates having convexly rounded end portions removably disposed transversely in and slidable longitudinally of said channel member with said convexly rounded end portions resiliently engaged by said concavely curved flange portions, said plates being each provided at one end portion with a ledge portion overhanging one of said channel flange portions and serving to release the plate from the channel member upon elevation thereof, and rectangular indicia-displaying slips adhesively secured to said plates.

2. A changeable indicia displaying device comprising an elongated channel member having a central web portion serving as a base and a pair of resilient flange portions extending from opposite sides of the base and disposed in normally upturned spaced parallel relation, said flange portions being curved in the direction of their widths to define longitudinally concave confronting surfaces, a plurality of oblong plates having convexly rounded end portions removably disposed transversely in and slidable longitudinally of said channel member with said convexly rounded end portions resiliently engaged by said concavely curved flange portions, said plates being each provided at one end portion with a ledge portion overhanging one of said channel flange portions and serving to release the plate from the channel member upon elevation thereof.

References Cited in the file of this patent

UNITED STATES PATENTS

| | | |
|---|---|---|
| 355,209 | Rimington | Dec. 28, 1886 |
| 1,030,785 | Lambert | June 25, 1912 |
| 1,331,995 | McMullen | Feb. 4, 1920 |
| 2,897,031 | Frost | July 28, 1959 |